United States Patent [19]

Markovs et al.

[11] Patent Number: 5,271,760
[45] Date of Patent: Dec. 21, 1993

[54] RECOVERY OF LIQUID MERCURY FROM PROCESS STREAMS

[75] Inventors: John Markovs, Yorktown; Richard T. Maurer, Nanuet, both of N.Y.

[73] Assignee: UOP, Des Plaines, Ill.

[21] Appl. No.: 24,036

[22] Filed: Mar. 1, 1993

[51] Int. Cl.$^5$ ............................................. C22B 43/00
[52] U.S. Cl. ........................... 75/670; 210/673; 210/679; 210/688; 210/689; 95/134
[58] Field of Search .................. 75/670; 55/31, 72; 210/673, 679, 688, 689

[56] References Cited

U.S. PATENT DOCUMENTS

| | | | |
|---|---|---|---|
| 3,755,989 | 9/1973 | Fornoff et al. | 55/72 |
| 4,101,631 | 7/1978 | Ambrosini et al. | 423/210 |
| 4,874,525 | 10/1989 | Markovs | 210/673 |
| 4,892,567 | 1/1990 | Yan | 55/33 |
| 5,089,034 | 2/1992 | Markovs et al. | 55/31 |

OTHER PUBLICATIONS

Barrer et al, J. Chem. Soc. (1967) pp. 19-25.

Primary Examiner—Melvyn J. Andrews
Attorney, Agent, or Firm—Thomas K. McBride; Richard G. Miller

[57] ABSTRACT

Mercury is often removed as an impurity from process fluid streams by adsorption in fixed beds using any of several well-known adsorbents having the ability to selectively adsorb mercury. It is also common to reintroduce this sequestered mercury into the environment by means of the spent gas used to periodically regenerate the fixed beds. A solution to this problem is provided by the present invention in which the mercury is removed from the process stream using at least two cyclically regenerated adsorption beds in combination with a condenser whereby upon regeneration of one bed, the regeneration stream effluent therefrom is treated in the condenser to recover the bulk of the mercury as liquid mercury and recycling the overhead from the condenser to another bed engaged in the adsorption-purification of fresh feedstock.

9 Claims, 1 Drawing Sheet

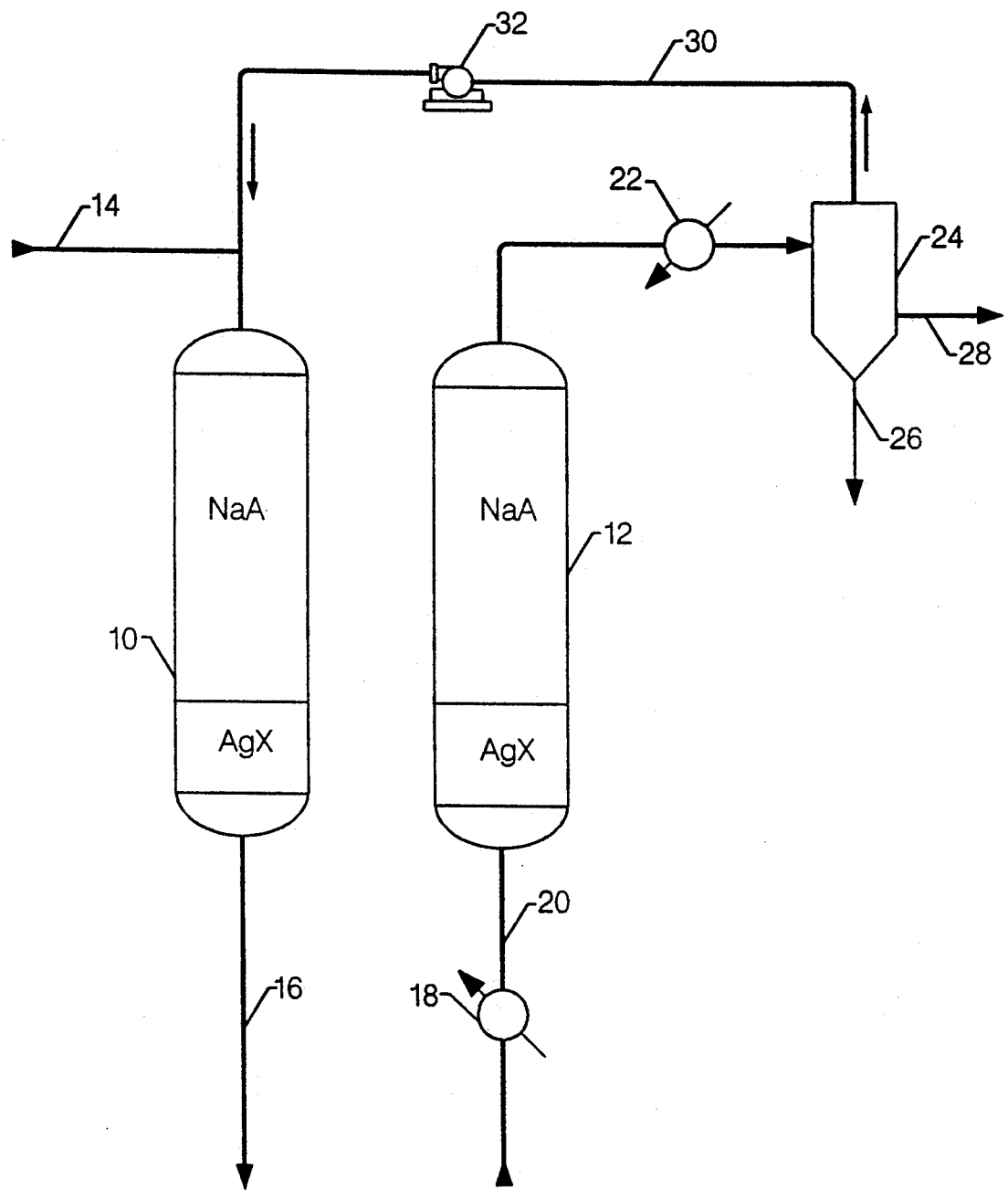

RECOVERY OF LIQUID MERCURY FROM PROCESS STREAMS

FIELD OF THE INVENTION

The present invention relates in general to the purification of feedstock fluid streams and more particularly to the removal of mercury entrained in liquid streams or mercury vapor from gas streams, such as natural gas, by means of adsorbing the mercury using an integrated system of at least two regenerated fixed adsorbent beds. In the system the mercury is removed from the feed stream by selective adsorption in the beds, each of which undergoes cyclic adsorption and desorption, i.e., regeneration, stages. Upon regeneration of one of these beds the effluent is treated by passage through a condenser to recover a portion of the mercury content as liquid mercury and thereafter recycled to another of the beds in which the adsorption stage of the cycle is in progress in the treatment of another portion of the feedstock fluid stream.

BACKGROUND OF THE INVENTION

Mercury is an undesirable constituent of a considerable number of fluid streams, and consequently a considerable number of methods have been devised to selectively remove the mercury. In the main the mercury impurity is in the form of elemental mercury, but in a few instances mercury compounds, including organic mercury compounds, are of concern. In the case of elemental mercury the purification processes are largely adsorption procedures, and in these the most common type of adsorbent is an activated carbon having supported thereon a mercury reactive material such as potassium triodide, sulfur, sulfuric acid, chlorine, silver, copper or various salts of silver or copper. Other supports for the mercury reactive materials include silicas, aluminas, silica-aluminas and zeolitic aluminosilicates. Ion-exchange resins, particularly the strongly basic anion-exchange types which have been reacted with a polysulfide, have also been reported. See U.S. Pat. No. 4,591,490 (Horton) in this latter regard. The disclosures of U.S. Pat. No. 4,500,327 (Nishino) and U.S. Pat. No. 4,196,173 (de Jong et al) are pertinent to the use of activated carbon supports.

Perhaps the two greatest problems involved in removing mercury from fluid streams are (a) achieving a sufficient reduction in the mercury concentration of the feed stream being treated, and (b) avoiding the reentry of the recovered mercury into some other environmental medium. Although permissible levels of mercury impurity vary considerably, depending upon the ultimate intended use of the purified product, for purified natural gas, mercury concentrations greater than about 0.01 microgram per normal cubic meter ($\mu g/nm^3$) is considered undesirable, particularly in those instances in which the natural gas is to be liquified by cryogenic processing. In the cases where mercury is removed from process streams by use of non-regenerable adsorbents, very large adsorption beds have been required This is because not only sufficient adsorbent must be present for the long term equilibrium capacity, but also enough adsorbent to contain the mass transfer (reaction) zone. In the case where the mercury removal is done by regenerative means, less adsorbent is required since only the adsorbent for containing the mass transfer zone is required. If regenerable, the regeneration media requirements are not only large but result in a large mercury-laden bed effluent which must itself be disposed of in an environmentally safe manner. A means has now been devised to avoid the need to remove any of the regeneration media from the system except as a purified product from which the mercury content has been reduced to acceptable low levels and to recover the mercury impurity as elemental liquid mercury. Such a combination allows for (a) attaining the lowest possible mercury levels in the process streams, (b) making full utilization of the regenerative mercury removal adsorbent, and (c) disposing of the mercury in an environmentally safe manner.

THE DRAWINGS

The sole FIGURE of the drawings is a schematic flow diagram showing one embodiment of the process system used in the practice of this invention.

SUMMARY OF THE INVENTION

In accordance with the present invention in the process for removing mercury from a fluid stream containing a mercury concentration of at least 0.02, and preferably at least 2.0, $\mu g/nm^3$ which comprises passing said stream as a feedstock periodically in sequence through at least two fixed beds containing a selective adsorbent for mercury, each of said beds cyclically undergoing the stages comprising:

(a) adsorption, wherein the feedstock is passed through said bed and the mercury constituent thereof is selectively adsorbed and the non-adsorbed constituents are removed from the bed as an effluent having a reduced concentration of mercury; and (b) purge desorption, wherein the adsorbed mercury is desorbed by the passage therethrough, preferably in a direction countercurrent to the direction of flow during stage (a), of a regeneration fluid stream until the major proportion of the adsorbed mercury has been removed from the bed in the bed effluent;

(c) the improvement which comprises operating the adsorption and purge desorption stages in the beds so that the adsorption stage in at least one bed coincides with the purge desorption stage in another bed, and passing the effluent stream from the bed undergoing purge desorption to the bed undergoing adsorption with an intermediate passage through a condenser wherein at least a portion of the mercury content is condensed and recovered as liquid mercury.

DETAILED DESCRIPTION OF THE INVENTION

In carrying out the present process at least two fixed regenerable adsorption beds are required for the reason that there must always be available at least one bed to receive and adsorb residual mercury from the effluent from a bed undergoing purge desorption, after the bulk of the mercury has been recovered as a liquid therefrom by intermediate passage through a condenser. Thus, one bed must be in some part of the adsorption stage of a cycle which includes at least an adsorption stage and a purge desorption stage. The cycle can, however, include other stages, some of which are applicable to liquid phase processes. For example, it is common to remove the feedstock remaining in the bed void space at the end of the adsorption step. In liquid phase operation this feedstock is either drained by gravity or pumped out and recycled to feed. In vapor phase operation, careful plug flow purging at existing bed temperature with the regeneration gas is used to recover the void space feedstock. Following regeneration by purge desorption at elevated temperature, a distinct stage of bed cool-down is sometimes used. During this step a cooling medium is passed through the hot adsorption vessel to carry out the sensible heat remaining in the adsorption vessel at the end of the regeneration heat step. The cooling is continued until the bulk of sensible heat is carried out of the sorption vessel. In many instances cooling is carried out with a medium other than the feedstock. It is customary to drain this medium before proceeding to the fill step. This adds another step to the overall process cycle. In those cases where a liquid cooling medium is employed, a further step in which the cooling medium remaining in the adsorbent bed void space at the end of the regeneration cool step is removed from the bed either by gravity flow or by pumping. Finally a void space filling step may be employed. During the fill step, either product or feedstock is used to fill the void spaces in the adsorption vessel before returning the vessel back into service. This is necessary in liquid phase operation since failure to do so will result in two phase flow and vapor lock. In large volume sorption vessels the time required for filling the vessel can be substantial especially since often the rate at which feed or product is available is often limited. Upon completion of the fill step the sorption vessel is ordinarily ready to be put back into the sorption step.

From the preceding description it is apparent that the length of the various stages in the overall cycle of each adsorbent bed may dictate that more than two beds be employed in the system in order that the regeneration effluent from a given bed can be transferred, after cooling to condense out liquid mercury, to another bed undergoing the adsorption-purification stage of the cycle. Depending upon the particular feedstock being treated and whether it is being treated in the liquid or vapor phase, it is possible that the regeneration effluent from a single bed may be passed to more than one other bed or, conversely, that the regeneration effluent from more than one bed may be simultaneously passed to a single other bed of the system.

The particular adsorbent employed in the fixed adsorbent beds is not a critical factor. Any of the adsorbents well known in the art for adsorbing mercury impurities and which can be thermally regenerated can be utilized. Since, however, the beds are periodically, i.e., cyclically, regenerated in the practice of the present process, the capacity of the adsorbent to adsorb the mercury impurity is less important than the property of having a strong affinity for the mercury impurity which is employed. Thus, preferred adsorbents are those which comprise constituents chemically reactive with mercury or mercury compounds. Various cationic forms of several zeolite species, including both naturally occurring and synthesized compositions, have been reported by Barrer et al [J. Chem. Soc. (1967) pp. 19-25] to exhibit appreciable capacities for mercury adsorption due to the chemisorption of metallic mercury at the cation sites. Some of these zeolitic adsorbents reversibly adsorb mercury and others exhibit less than full, but nevertheless significant, reversibility. An especially effective adsorbent for use in the present process is one of the zeolite-based compositions containing cationic or finely dispersed elemental forms of silver, gold, platinum or palladium. A particularly preferred adsorbent of this type is disclosed in U.S. Pat. No. 4,874,525 (Markovs) wherein the silver is concentrated on the outermost portions of the zeolite crystallites. This adsorbent, as well as the other zeolite-based adsorbents containing ionic or elemental gold, platinum or palladium, is capable of selectively adsorbing and sequestering organic mercury compounds as well as elemental mercury. Zeolite A containing elemental gold is disclosed as an adsorbent for mercury in the later issued U.S. Pat. No. 4,892,567 (Yan). Silver wool has also been proposed to adsorb mercury from hydrocarbon streams. See U.S. Pat. No. 5,141,724 in this regard. The specific mention of these materials is not intended to be limitative, the composition actually selected being a matter deemed most advantageous by the practitioner given the particular circumstances to which the process is applied.

While the purge medium used to regenerate the beds advantageously has the same composition and is a portion of the purified product from the primary bed, other regeneration media, well known in the art, both sorbable and non-sorbable, can be utilized. Regeneration media of the so-called non-sorbable kind include substances such as methane, nitrogen, hydrogen and the like whose presence in the purified product stream is not objectionable. Particularly preferred are portions of the purified product streams from which the more strongly adsorbed materials, if any, have been removed. Thus in the case of treating natural gas to remove mercury, the purified product may contain minor amounts of $C_2+$ hydrocarbons which are more strongly adsorbed on zeolites than is methane. The removal of some or all of these higher hydrocarbons is preferred before the purified methane is employed as the purge medium. Similar circumstances may arise in the removal of mercury from other feedstocks in which the purified product is a mixture of two or more compounds.

The temperature and pressure conditions for the cyclic adsorption and regeneration steps in the adsorbent beds are not critical and depend to some degree upon the particular feedstock being purified and whether the process is to be carried out in the liquid or in the range phase. In treating natural gas or other hydrocarbon streams, temperatures typically range from about 5° C. to 65° C. in the beds during the adsorption-purification step. During regeneration the purge medium is heated to at least 100° C., and preferably at least 200° C., higher than the temperature of the feedstock being purified. Pressure conditions can range from atmospheric to 2500 psia and are generally not critical, except of course during liquid phase operation wherein it is necessary to maintain sufficient pressure at the operating temperature to avoid vaporization of the feedstock and regeneration medium.

To condense out liquid mercury from the mercury-containing effluent from the adsorption beds during bed regeneration, conventional cooling and knock-out apparatus is suitably employed. The temperature to which the regeneration effluent is cooled during this procedure is preferably not greater than 55° C. and is advantageously as low as economically practical taking into account the chemical composition of the fluid stream being treated. In those instances in which the fluid stream contains water and/or carbon dioxide in addition to hydrocarbons, such as is typically the case with natural gas, the temperature and pressure conditions must be correlated to avoid undue formation of hydrocarbon hydrate or $CO_2$ hydrate formation.

A preferred embodiment of the present invention is illustrated by the following example together with the flow diagram of the drawings. In the drawing the process system is represented by dual adsorption beds integrated in a manner that continuous operation can be carried out by regenerating one primary bed while the other bed is involved in the adsorption of mercury. It will be understood by those of routine skill in the art that not all of the conduits and valves which would be present in an actual process system are shown in the flow diagram. The placement of these flow-directing means is largely dependent upon the placement of the essential adsorption beds and is not a matter necessary to an understanding of the process. In this embodiment the feedstock being treated for mercury removal is a natural gas stream containing water vapor and $CO_2$. The process is carried out in the vapor phase. Since most of the mercury adsorbents employed in the present process will also adsorb water and higher hydrocarbons, it is advantageous to employ composite fixed adsorbent beds which contain in the bed section first contacted by the stream being treated an adsorbent relatively free of cations or compounds strongly reactive with mercury but which exhibits an appreciable capacity for water adsorption. The alkali metal aluminosilicate zeolites, such as sodium zeolite A and sodium zeolite X and sodium zeolite Y, are very useful in this regard. A subsequent zone of the adsorption bed can be loaded with an adsorbent, such as silver-exchanged zeolite A or zeolite X, which has a high capacity for mercury. A composite bed of this kind is disclosed in U.S. Pat. No. 4,874,525. Such a bed is utilized as the primary bed in the process illustrated below:

With reference to the drawing, primary composite beds 10 and 12 each contain 49,000 pounds of ⅛" extruded sodium zeolite A pellets in the upper zone, and in the lower zone 7,970 pounds of ⅛" extruded zeolite X pellets having 13.6 weight percent silver as zeolite cations, 95 percent of which are located within 0.1 millimeters of the external surface of the pellets. Natural gas containing 793 ppm(v) water vapor, 14 parts per billion [ppb(v)] mercury vapor and about 5 volume percent $C_2$-$C_7$ hydrocarbons, is passed into bed 10 through line 14 at a pressure of 555 psia, a temperature of 21° C. and, in admixture with recycled gas from blower 32, passes through the bed at a superficial space velocity of 35.3 feet per minute. Water vapor is adsorbed in the upper zone on the NaA zeolite. The resulting dried natural gas containing the mercury vapor then passes through the lower zone containing the AgX zeolite whereby the mercury content is reduced to less than 10 parts per trillion and is recovered through line 16. During the adsorption step in bed 10, bed 12, which has previously undergone the same adsorption purification step as in bed 10, is undergoing regeneration. A portion of the purified product natural gas from bed 10 is passed through heater 18, wherein it is heated to 290° C., and a portion of the heated gas stream is directed at a pressure of 545 psia through line 20 countercurrently through bed 12. Mercury, water vapor and some $C_2$-$C_7$ hydrocarbons are desorbed from the two adsorption zones of the bed and the effluent is directed through chiller 22 in which the temperature is reduced to about 70° F. Under the existing pressure conditions, 540 psia, the formation of hydrocarbon hydrates is avoided so that in separator 24 condensed mercury vapor is removed as a liquid through line 26 and condensed water vapor along with a portion of the $C_2$-$C_7$ hydrocarbons are withdrawn through line 28. The vapor phase stream comprising principally methane saturated with water vapor and containing about 393 $\mu g/nm^3$ mercury vapor is then recycled at a temperature of about 70° F. through blower 32 and line 30 into bed 10 in combination with fresh feedstock entering the system through line 14.

As will be readily apparent to those of routine skill in the art in view of the foregoing, a number of modifications of the illustrated process scheme can be made without departing from the proper scope of this invention. For example, at the start of the regeneration of bed 12 in the process illustrated in the drawings, the regeneration gas stream effluent can be recycled back through the heater 18 until the temperature of at least a significant portion of the bed has been increased to the regeneration temperature. This increases the mercury concentration in the regeneration stream so that upon passing the bed effluent to the condenser, more liquid mercury can be recovered per unit volume of purge gas and less regeneration medium needs to be recycled through the receiving bed 10. Also, the adsorption bed does not need to contain a separate zone for dehydration of the feedstock. Both water and mercury can be removed on a regenerative basis with zeolites or activated alumina containing some measurable level of silver, gold, platinum or palladium. In cases where no dehydration is required the bed can contain these mercury-reactive metals carried on supports which do not have any appreciable water adsorption properties. Even the metals alone, for example, silver wool, can be used as the adsorbent for mercury.

What is claimed is:

1. In the process for removing mercury from a feedstock fluid stream containing a mercury concentration of at least 0.02 $\mu g/nm^3$ which comprises passing said stream as a feedstock periodically in sequence through at least two fixed beds containing a selective adsorbent for mercury, each of said beds cyclically undergoing the stages comprising:

(a) adsorption, wherein the feedstock is passed through said bed and the mercury constituent thereof is selectively adsorbed and the non-adsorbed constituents are removed from the bed as an effluent having a reduced concentration of mercury; and (b) purge desorption, wherein the adsorbed mercury is desorbed by the passage therethrough of a regeneration fluid stream until the major proportion of the adsorbed mercury has been removed from the bed in the bed effluent;

the improvement which comprises operating the adsorption and purge desorption stages in the beds so that the adsorption stage in at least one bed coincides with the purge desorption stage in another bed, and passing the effluent stream from the bed undergoing purge desorption to the bed undergoing adsorption with an intermediate passage through a condenser wherein at least a portion of the mercury content is condensed and recovered as liquid mercury.

2. Process according to claim 1 wherein the feedstock fluid stream contains a mercury concentration of at least 2.0 $\mu g/nm^3$.

3. Process according to claim 1 wherein in stage (b) the bed is regenerated by passing the purge desorbent stream therethrough in a direction countercurrent to the direction of flow therethrough in stage (a).

4. Process according to claim 1 wherein the fluid stream being treated for mercury removal is natural gas.

5. Process according to claim 1 where the fluid stream being treated is liquid LPG.

6. Process according to claim 1 where the fluid stream being treated is naphtha.

7. Process according to claim 1 wherein the adsorbent in the fixed beds comprises particles containing at least one metal selected from the group consisting of silver, gold, platinum and palladium.

8. Process according to claim 5 wherein the adsorbent particles comprise crystallites of a zeolitic molecular sieve having pore diameters of at least 3.0 Angstroms and in which the said zeolite crystallites forming the outer shell of the adsorbent particles to a depth of not greater than about 0.1 millimeter into the particles and constituting less than about 35 volume percent of said particles contain ionic or elemental silver.

9. Process according to claim 6 wherein the zeolitic molecular sieve having pore diameters of at least 3.0 Angstroms is zeolite A or zeolite X or zeolite Y.

* * * * *